Feb. 13, 1940. R. W. LEACH 2,190,602
COCK OR VALVE
Filed Oct. 18, 1937

Inventor
ROBERT W. LEACH
By Lewis D. Knigsford
Attorney

Patented Feb. 13, 1940

2,190,602

UNITED STATES PATENT OFFICE 2,190,602

COCK OR VALVE

Robert William Leach, Newport, England

Application October 18, 1937, Serial No. 169,607
In Great Britain October 17, 1936

4 Claims. (Cl. 251—93)

(Granted under the provisions of sec. 14, act of
March 2, 1927; 357 O. G. 5)

This invention has for its object to provide an improved cock or valve of the kind in which the closure member is in the form of a rotary plug closure member and in which provision is made for flow of fluid through the valve in a direction parallel with the axis of rotation of the closure member.

The invention comprises the combination of a body part having a ported seating surface, a rotatable closure member in the form of a plug adapted to co-operate with the said seating surface, and a ported retaining member adapted to hold the closure member on its seating in the body part, interacting seating surfaces being also provided on the closure member and the retaining member.

Figure 1:
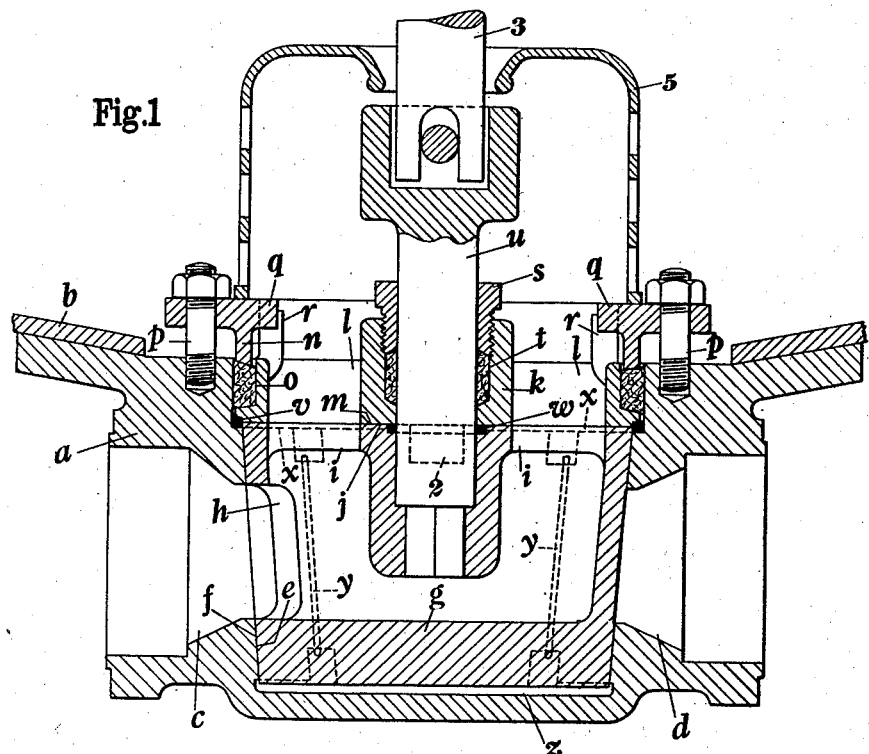
Figure 2:
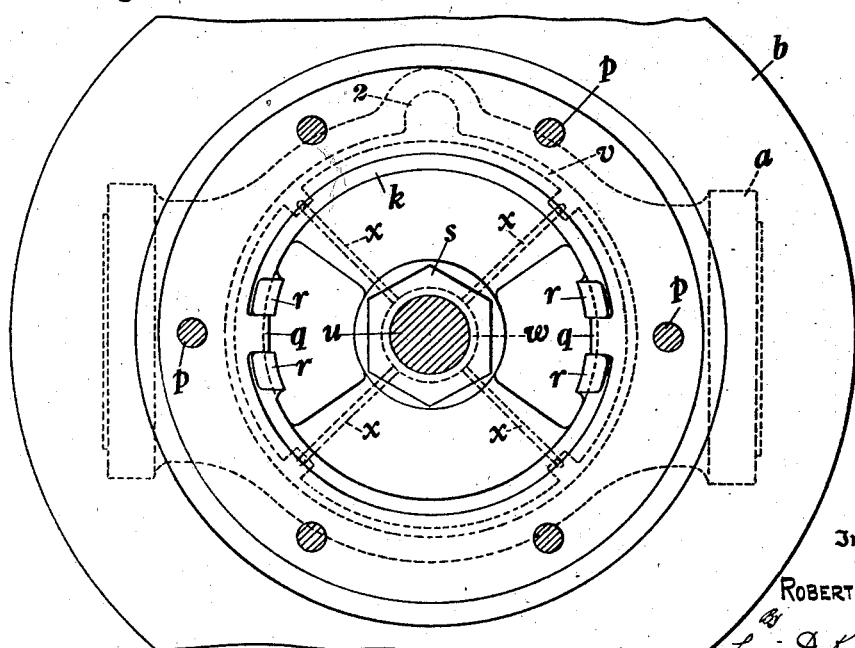

In the accompanying drawing:

Figures 1 and 2 are a sectional elevation and a part sectional plan respectively of a rotary plug valve or cock adapted to be mounted, for example, at the lower end of a tank or other receptacle.

In carrying the invention into effect as shown in Figures 1 and 2 the hollow body part $a$ of the valve has its upper open end adapted to be attached to the receptacle (a part of which is indicated by $b$), and at one side of the body part $a$ is provided a lateral passage $c$ for admitting fluid from a pipe (not shown) into the receptacle. At a position diametrically opposite to the passage $c$ is another lateral passage $d$ for discharging the receptacle into another pipe (not shown). For some purposes each of the lateral passages may be used for discharging fluid from the receptacle, or only one or more than two such passages may be provided. The interior of the body part $a$ is shaped to form a seating surface $e$ for co-operating with the conical or cylindrical surface $f$ of a hollow rotatable plug $g$. The seating surface $e$ in the body part is penetrated by lateral passages $c$, $d$, and the conical or cylindrical surface $f$ of the plug is formed with an opening $h$ adapted to be brought into communication with the passages $c$, $d$. If desired more than one opening $h$ may be provided in the surface of the plug.

The lower end of the plug $g$ is closed as shown and the upper end is provided with an opening or openings $i$ through which fluid can flow into or out of the receptacle in a direction parallel with the axis of the plug. Also the upper end of the plug is shaped to form a seating surface $j$ for co-operating with the underside of a retaining member $k$.

The retaining member $k$ is in the form of a circular or other plate having one or more passages $l$ formed through it between its upper and lower sides, and its lower side is adapted to form a seating surface $m$ for co-operating with the upper seating surface $j$ on the plug $g$. The retaining member $k$ is located in the open upper end of the body part $a$ and is held in position by an annular gland $n$ and packing $o$, the gland $n$ being secured to the body part by screws $p$, and rotation between the gland and retaining member $k$ being prevented by interengaging projections $q$, $r$ on these parts. The retaining member $k$ is also provided at its centre with a gland $s$ and packing $t$ through which passes an operating stem $u$ attached to the plug $g$. The operating stem $u$ is connected to a part 3 of the operating mechanism and is surrounded by a perforated cage 5 through which the fluid passes to and from the receptacle.

In the example above described, the arrangement is such that the plug $g$, when in the position shown, allows fluid to flow into the receptacle from the lateral passage $c$. On rotating the plug $g$ through 90° this flow is interrupted. On rotating it through a further 90° the receptacle can be discharged through the other lateral passage $d$. But in all forms the construction provides a double interruption of the path along which the fluid flows when the plug $g$ is in the closed position, one of the interruptions being effected by the co-operation of the plug $g$ and body part $a$ and the other by the co-operation of the plug $g$ and retaining member $k$, thus minimising the risk of leakage past the plug.

To facilitate the formation of a fluid tight seal between the plug $g$ and the other parts, provision may be made for supplying lubricant or plastic sealing substances between the said parts. In the example shown, an annular passage $v$ is provided between the plug $g$ and the body part $a$ at the upper end of the plug, and another such passage $w$ is provided around the operating stem $u$ and between the plug $g$ and retaining member $k$, these passages being inter-connected by radial passages $x$. Further, longitudinal passages $y$ provided in the body part $a$ or plug $g$ extend from the passage $v$ to a chamber $z$ beneath the closed end of the plug $g$, all the passages being supplied with lubricant or sealing substance from a storage chamber (not shown) provided on the body part $a$ and communicating by way of an aperture 2 in the latter with the passage $v$.

The invention is not limited to the examples above described as subordinate constructional details may be varied to suit different requirements.

Having now particularly described and ascertained the nature of my said invention and in what manner the same is to be performed, I declare what I claim is:

1. A plug valve comprising a body having a bore therein, and ports extending from said bore, a rotatable plug in said bore having a port therein co-operating with the body ports and having a seating surface at one end with a plurality of axial passageways therethrough communicating with said plug port, a retaining member engaging said seating surface and holding said plug in position, said retaining member having openings therein co-operating with said passageways and sealing portions for closing said passageways when the plug is turned, and means for holding said retaining member in position.

2. A plug valve comprising a body having a bore therein and ports extending from said bore, a rotatable plug in said bore having a port therein co-operating with the body ports and having a plurality of axial passageways therethrough communicating with said plug port, a retaining member to hold said plug in position, said retaining member having openings therein co-operating with said passageways, a stem passing through said retaining member for rotating said plug, means for sealing the passage of said stem through said retaining member, a packing and a packing gland adjustably and non-rotatably secured to said body and providing a seal between said retaining member and said body and holding said retaining member in position, and means on said retaining member engaging said gland to prevent rotation thereof when the plug is rotated.

3. A plug valve comprising a body having a bore therein and ports extending from said bore, a rotatable plug in said bore having a port therein co-operating with the body ports and having a plurality of axial passageways therethrough communicating with said plug port, a retaining member for holding said plug in position, said retaining member having openings therein co-operating with said passageways, a stem passing through said retaining member for rotating said plug, means for sealing the passage of said stem through said member, adjustable packing means for sealing the joint between said body and retaining member and for holding said retaining member in position, and means for lubricating and sealing the surfaces between said body plug and retaining member.

4. A plug valve comprising a body having a seat therein and ports extending from said seat, a rotatable plug seated in said seat having a port therein co-operating with the body ports and having a plurality of axial passageways therethrough communicating with said plug port, a retaining member engaging the opposite end of said plug for holding the plug in position, said retaining member having openings therein co-operating with said passageways, a stem passing through said retaining member for rotating said plug, means for sealing the passage of said stem through said member, adjustable packing means for sealing the joint between said body and retaining member and for holding said retaining member in position, and means for lubricating and sealing the surfaces between said body, plug and retaining member comprising an annular lubricant recess formed at the junction of said body, retaining member and plug, an annular recess adjacent said stem, a plurality of radial grooves between the retaining member and said plug connecting said recesses, and a plurality of grooves in the seating surface of the plug and casing connected to the first said recess.

ROBERT WILLIAM LEACH.